US012152763B1

(12) United States Patent
Bai et al.

(10) Patent No.: US 12,152,763 B1
(45) Date of Patent: Nov. 26, 2024

(54) HAND-HELD WORKING LAMP

(71) Applicant: NINGBO JINGHUI OPTO-ELECTRONIC CO., LTD., Zhejiang Province (CN)

(72) Inventors: Guohui Bai, Zhejiang Province (CN); Xia Xiao, Zhejiang Province (CN)

(73) Assignee: NINGBO JINGHUI OPTO-ELECTRONIC CO., LTD., Zhejiang (CN)

( * ) Notice: Subject to any disclaimer, the term of this patent is extended or adjusted under 35 U.S.C. 154(b) by 0 days.

(21) Appl. No.: 18/407,230

(22) Filed: Jan. 8, 2024

(30) Foreign Application Priority Data

Aug. 9, 2023 (CN) ......................... 202310998910.2
Aug. 9, 2023 (CN) ......................... 202322135349.3

(51) Int. Cl.
*F21V 19/00* (2006.01)
*F21V 21/40* (2006.01)
*F21Y 115/10* (2016.01)

(52) U.S. Cl.
CPC ........ *F21V 19/0035* (2013.01); *F21V 21/406* (2013.01); *F21Y 2115/10* (2016.08)

(58) Field of Classification Search
CPC .... F21V 19/0035; F21V 21/406; F21V 21/40; F21V 21/08; F21V 21/0808; F21V 21/0965; F21V 21/0832; F21V 19/02; F21V 14/02; F21V 14/025; F21V 21/104; F21Y 2115/10
See application file for complete search history.

(56) References Cited

U.S. PATENT DOCUMENTS

2005/0265032 A1* 12/2005 Kovacik ................. F21V 29/77 362/451
2014/0036511 A1* 2/2014 Whitfield .............. F21L 14/023 362/311.02
2019/0107259 A1* 4/2019 Doberstein ............... F21V 3/02
2023/0304650 A1* 9/2023 Bai ......................... F21K 9/237

FOREIGN PATENT DOCUMENTS

CN 219263997 U 6/2023

* cited by examiner

*Primary Examiner* — Bao Q Truong

(74) *Attorney, Agent, or Firm* — Charles C. Achkar; Ostrolenk Faber LLP.

(57) ABSTRACT

The present disclosure provides a hand-held working lamp and relates to the field of lamps. The hand-held working lamp includes a lamp body. The lamp body includes a lamp holder and a lamp pole which are detachably connected. Lamp plates are hinged to the lamp holder. An overturning angle of the lamp plate on the lamp holder approximates to a right angle/flat angle. The lamp pole is provided with a connecting seat capable of being connected to an external lamp bulb. The lamp holder is provided with a connector capable of being connected to the connecting seat. The lamp pole is provided with a functional seat. The functional seat is provided with a hook, an adsorption member and a socket.

10 Claims, 18 Drawing Sheets

HAND-HELD WORKING LAMP

CROSS REFERENCE TO RELATED APPLICATIONS

The present application claims priority to China Application No. 202310998910.2 filed Aug. 9, 2023, and China Application No. 202322135349.3, filed on Aug. 9, 2023, the subject matter of each of which are incorporated herein by reference in their entirety.

TECHNICAL FIELD

The present disclosure relates to the field of lamps, and in particular to a hand-held working lamp.

BACKGROUND

Working lamps are common lighting products in our daily life, and they are widely selected and used by consumers in working scenarios and outdoor environments. A Chinese patent document No. CN219263997U discloses "a multi-functional hand-held working lamp", including a main body, where a lamp cap is arranged at a front end of the main body. The multi-functional hand-held working lamp is characterized in that a hand-held member is arranged at a lower end of the main body; a foldable support frame is arranged on the main body; LED lamp beads and a laser lamp are arranged in the lamp cap; and a first button used for controlling the LED lamp beads to be turned on or turned off and a second button used for controlling the laser lamp to be turned on or turned off are arranged on the main body. The present disclosure provides a multi-functional hand-held working lamp with a variety of functions integrated, which can be held in the hand for work, and can also be obliquely placed on the ground to release both hands for work. In addition, a more distant place can be irradiated by way of the laser irradiation function, for example, the multi-functional hand-held working lamp can be used to emit signals to indicate an orientation of a Logo. However, the hand-held working lamp is designed in one piece, which is limited to hand-held operation by a user, and the lighting characteristics of lamplight mainly lie in the irradiation distance, etc.

Therefore, we provide a hand-held working lamp of which the lighting range of lamplight can be adjusted to cope with needs of different scenarios. A hand-held lamp pole and a lamp holder can be conveniently disassembled and assembled, and the lamp holder and the lamp pole can be respectively and additionally connected to a matched lamp body apparatus for use. The lamp body can be suspended to and matched with an external pendant to be used as a ceiling lamp. The lamp body can be fixed to a surface of an external object for use by way of an adsorption member. The functions of the hand-held working lamp are diverse, thereby bringing convenience to the user.

SUMMARY

(I) Technical Problem to Be Solved

The technical problem to be solved by the present disclosure is to provide a hand-held working lamp so as to overcome the defects in the prior art.

(II) Technical Solution

In order to solve the technical problem, the present disclosure provides a hand-held working lamp, including a lamp body, where the lamp body includes a lamp holder and a lamp pole which are detachably connected, lamp plates are hinged to the lamp holder, and an overturning angle of the lamp plate on the lamp holder approximates to a right angle/flat angle; the overturning angle of the lamp plate on the lamp holder can be freely selected between 0 and 90 degrees; in the present embodiment, three lamp plates are arranged, and the three lamp plates can be overturned by the same angle for use, or an individual lamp plate therein can be separately overturned so that included angles between the plurality of lamp plates and the lamp holder are different, and the plurality of lamp plates be overturned in various states so that the lamp body can achieve a lighting effect of different ranges in order to cope with needs of different scenarios, thereby bringing convenience to the user; the lamp pole is provided with a connecting seat capable of being connected to an external lamp bulb, and the lamp holder is provided with a connector capable of being connected to the connecting seat; the lamp pole is provided with a functional seat, and the functional seat is provided with a hook, an adsorption member and a socket; when in use, the lamp body is capable of being matched with an external pendant by way of the hook to be suspended for use; the lamp body is capable of being fixed to a surface of an object for use by way of the adsorption member. An effect of various lighting ranges is achieved by overturning the lamp plate on the lamp holder; and the lamp holder is capable of being connected to the connecting seat of the external lamp bulb for mating use.

Further, the lamp plates are distributed in a circular array on the lamp holder, the lamp holder is provided with mounting cavities, the lamp plate is provided with a bracket located in the mounting cavity, the mounting cavity is provided with a hinged block, and the bracket is provided with a hinged hole rotationally connected to the hinged block.

Further, the functional seat is provided with an accommodating groove capable of accommodating the hook, the accommodating groove is provided with hinged grooves, and the hook is provided with hinged posts rotationally connected to the hinged grooves.

Further, the adsorption member is located on one side of the hook, the socket is located on one side of the adsorption member, and the socket is capable of being externally connected to a plug wire of a neighboring lamp body. In the present embodiment, the effect of simultaneous illumination of a plurality of lamp bodies can be achieved by connecting the plurality of lamp bodies in series in the manner that the plug wires thereof are plugged into the socket.

Further, a support is arranged at one end of the lamp pole, the support is in the shape of a ring, and the support is provided with lock grooves.

Further, the lamp holder is provided with lock holes, and locking members matched with the lock holes are connected to the lock groove. By way of the arrangement, the lamp pole and the lamp holder can be further fixed easily, which prevents the lamp pole and the lamp holder from becoming loose and disengaging from each other during use of the lamp body.

Further, the mounting cavity is communicated with a first wire hole, the bracket is provided with a second wire hole communicated with the first wire hole, primitive wires of a circuit in the lamp holder and LED lamp sets in the lamp plate are connected conveniently due to the arrangement of the first wire hole and the second wire hole, the LED lamp sets are arranged in the lamp plate, and the lamp plate is provided with a transparent lampshade.

Further, the overturning angle of the lamp plate on the lam holder is able to be an acute angle by way of the bracket.

Further, the hook is in the shape of a trapezoid, one end of the hook is provided with an opening, the hook is provided with a clamping block, a limiting frame matched with the clamping block is mounted on the accommodating groove, and the limiting frame is used for limiting the hook.

Further, the connector and the connecting seat are both in the shape of a spiral, and a magnetic member is used as the adsorption member, thereby facilitating adsorption and use of the lamp body and an external magnetic attraction material; and the lamp pole is provided with a holding part and a control switch, and the control switch controls a work state of the LED lamp set.

(III) Beneficial Effects

According to the hand-held working lamp provided by the present disclosure, the lamp body can be matched with an external pendant by way of the hook to be suspended and used as a ceiling lamp. The lamp body can also be fixed to the surface of an object for use by way of the adsorption member. The overturning angle of the lamp plate on the lamp holder can be freely selected between 0 and 90 degrees so as to achieve the effect of different lighting ranges of the lamp body. After the lamp holder is separated from the lamp pole, the lamp holder can be connected to the connecting seat of the external lamp bulb for mating use. The lamp pole can also be connected to the external lamp bulb for use. The functions of the hand-held working lamp are diverse, thereby bringing convenience to a user.

Figure 1:
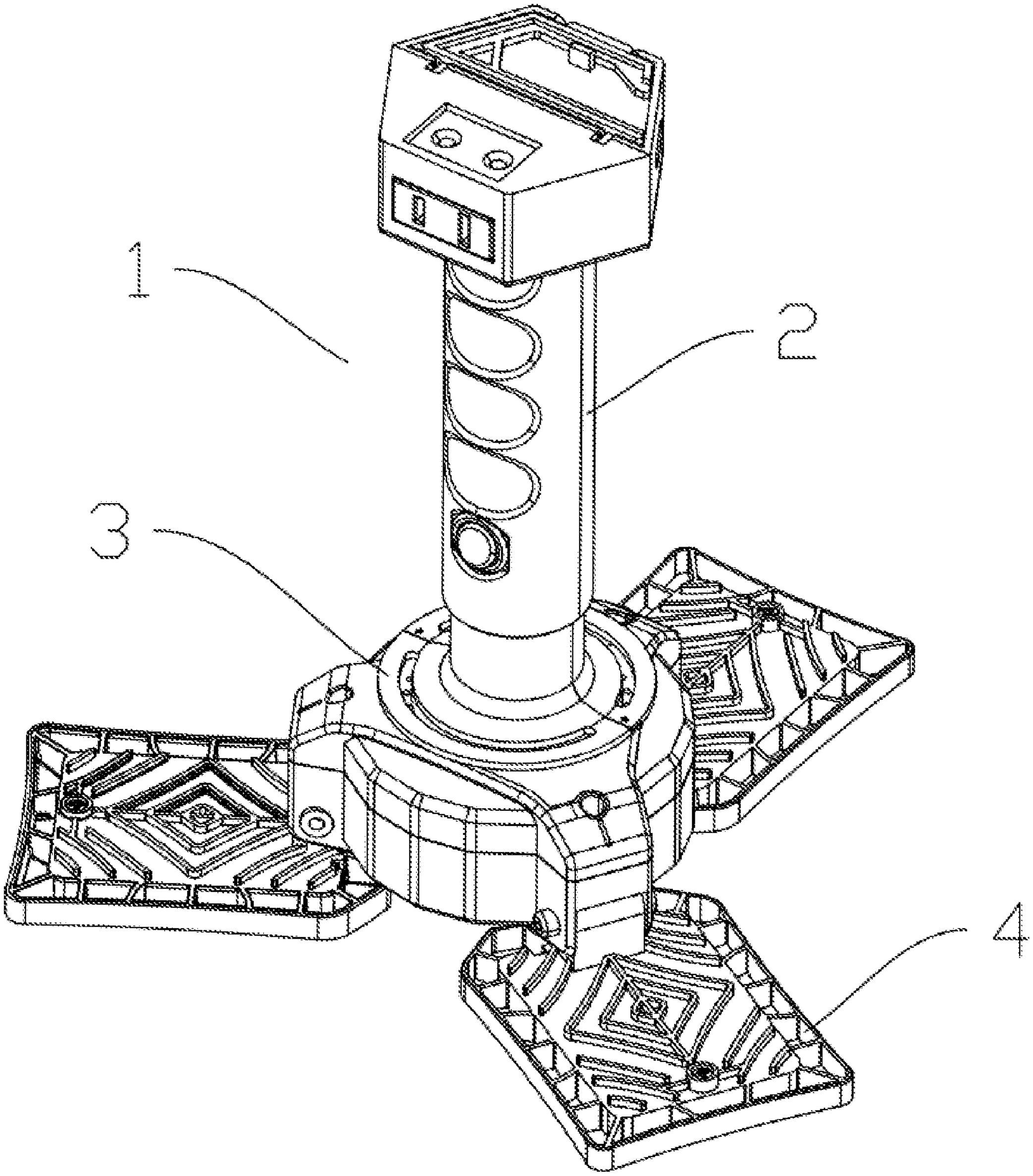
FIG. 1 is a first three-dimensional view of a hand-held working lamp of the present disclosure.
Figure 2:
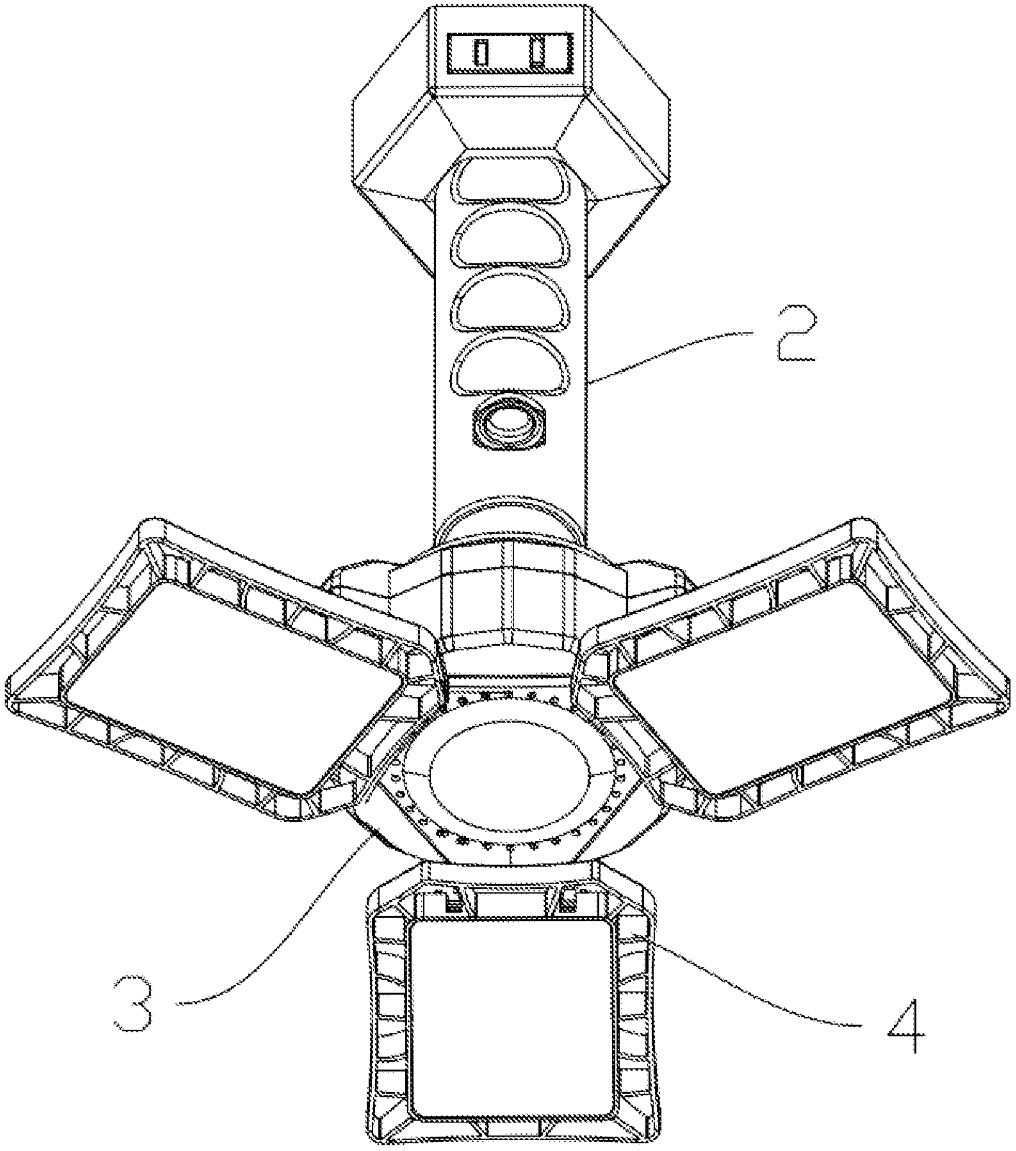
FIG. 2 is a second three-dimensional view of a hand-held working lamp of the present disclosure.
Figure 3:
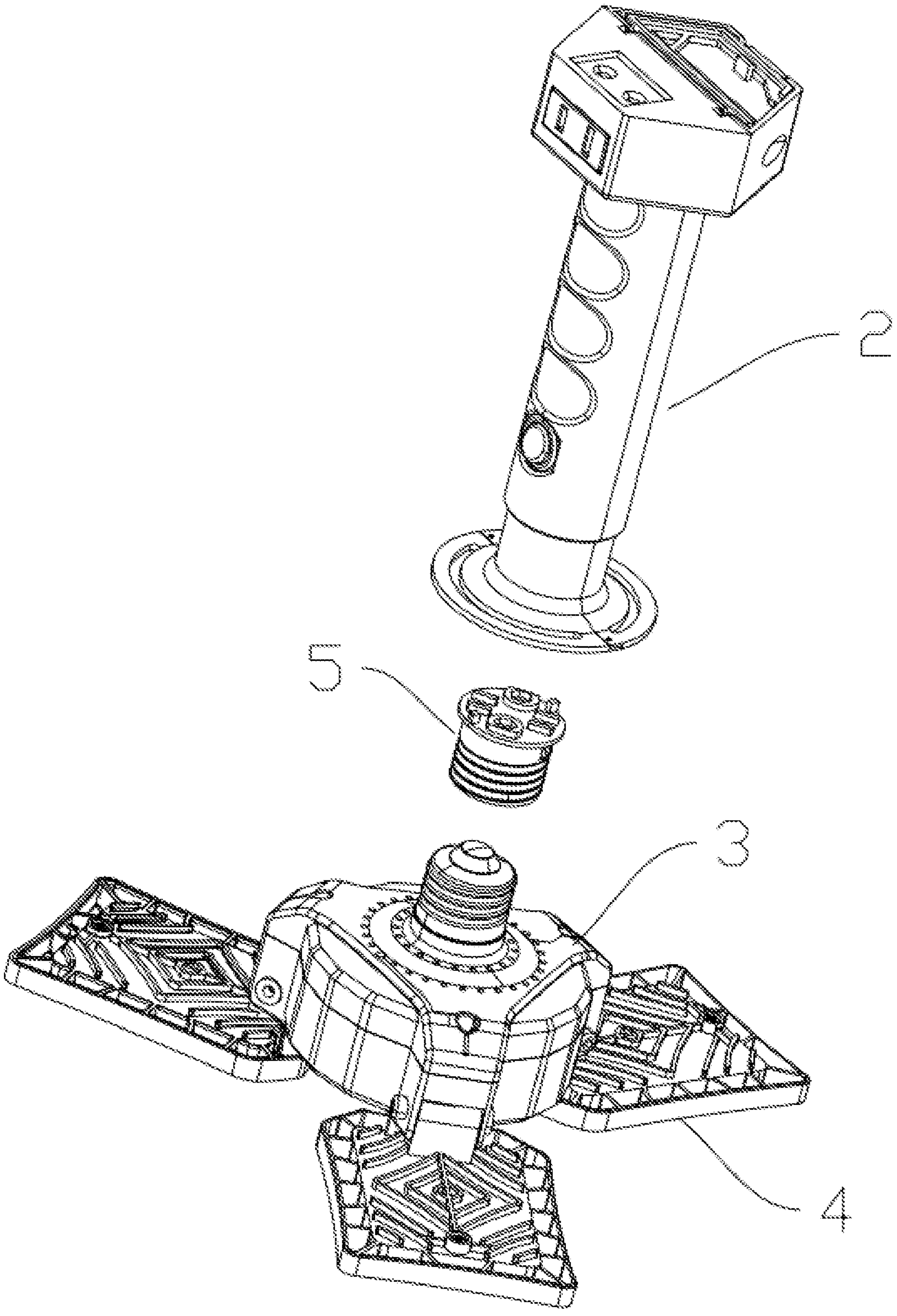
FIG. 3 is an exploded view of a hand-held working lamp of the present disclosure.
Figure 4:
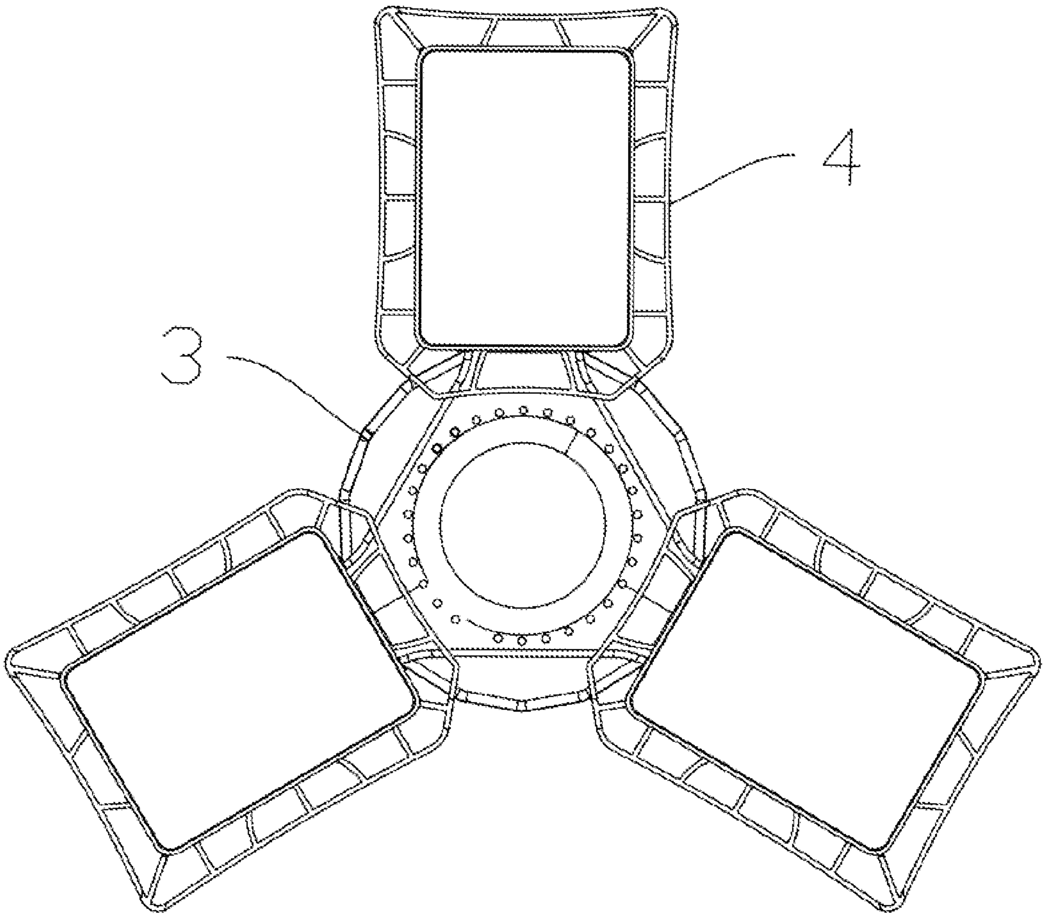
FIG. 4 is a plan view of a hand-held working lamp of the present disclosure.
Figure 5:
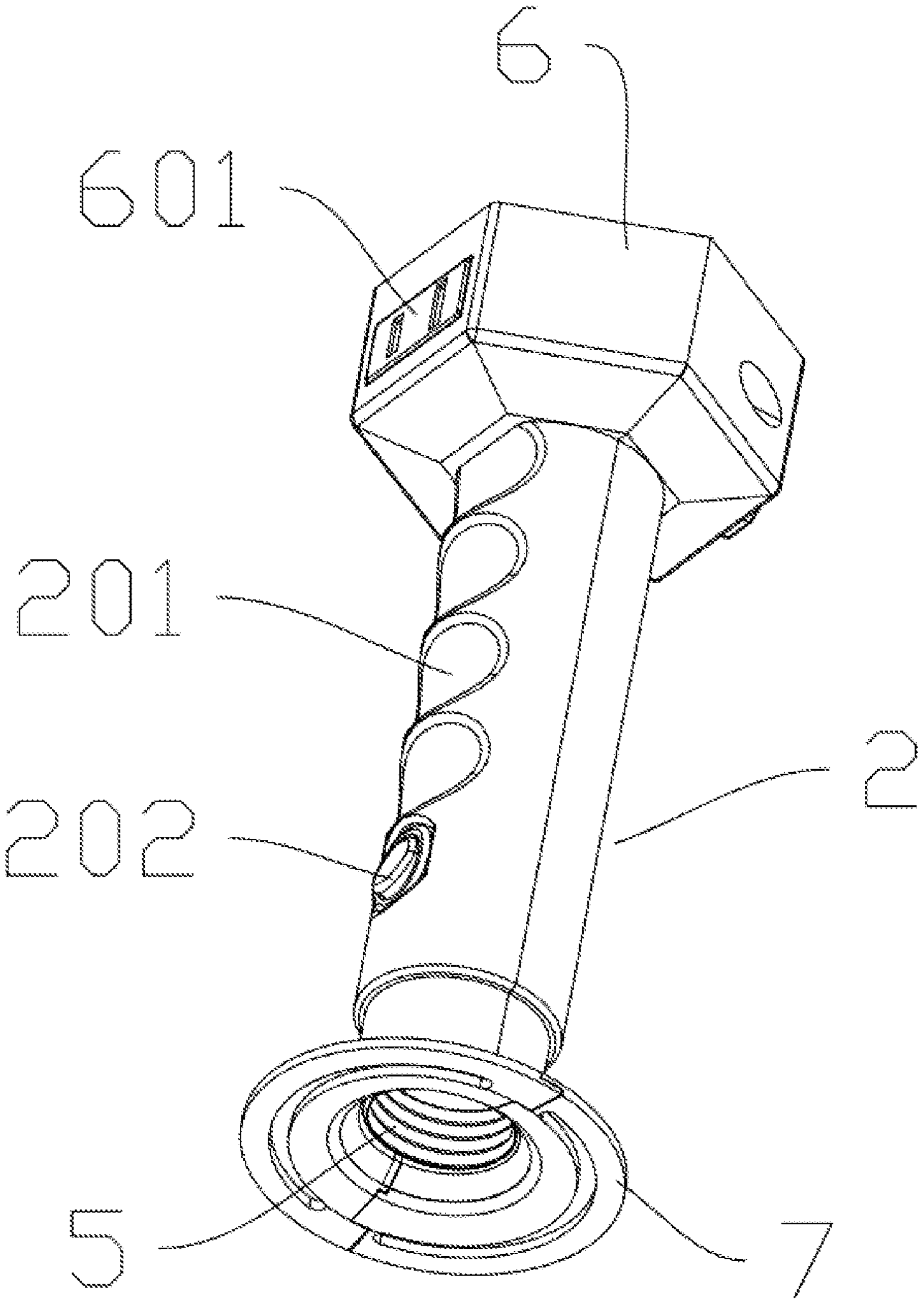
FIG. 5 is a schematic view of the structure of a lamp pole of a hand-held working lamp of the present disclosure.

Names of components corresponding to all reference numerals in the drawings: 1: lamp body; 2: lamp pole; 201: holding part; 202: control switch; 3: lamp holder; 301: connector; 302: mounting cavity; 303: hinged block; 304: lock hole; 305: first wire hole; 4: lamp plate; 401: bracket; 402: second wire hole; 403: hinged hole; 404: LED lamp set; 405: lampshade; 5: connecting seat; 6: functional seat; 601: socket; 602: adsorption member; 603: accommodating groove; 604: limiting frame; 605: hinged groove; 7: support; 701: lock groove; 8: hook; 801: hinged post; 802: opening; 803: clamping block; 9: locking member.

DETAILED DESCRIPTION

The specific implementations of the present disclosure are further described in detail below with reference to the accompanying drawings and embodiments. The following embodiments are used for describing the present disclosure rather than limiting the scope of the present disclosure.

With reference to FIG. 1 to FIG. 19, the present disclosure provides a hand-held working lamp, including a lamp body 1, where the lamp body 1 includes a lamp holder 3 and a lamp pole 2 which are detachably connected, lamp plates 4 are hinged to the lamp holder 3, and an overturning angle of the lamp plate 4 on the lamp holder 3 approximates to a right angle/flat angle. The lamp plate 4 is overturned on the lamp holder 3 at an angle between 0 and 90 degrees. In the present embodiment, three lamp plates 4 are arranged, and the three lamp plates 4 can be overturned by the same angle for use, or an individual lamp plate 4 therein can be separately overturned so that the lamp body 1 can achieve a lighting effect of different ranges. The lamp pole 2 is provided with a connecting seat 5 capable of being connected to an external lamp bulb, and the lamp holder 3 is provided with a connector 301 capable of being connected to the connecting seat 5. The lamp pole 2 is provided with a functional seat 6, and the functional seat 6 is provided with a hook 8, an adsorption member 602 and a socket 601. When in use, the lamp body 1 is capable of being matched with an external pendant by way of the hook 8 to be suspended for use. The lamp body 1 is capable of being fixed to a surface of an object for use by way of the adsorption member 602. An effect of various lighting ranges is achieved by overturning the lamp plate 4 on the lamp holder 3. The lamp holder 3 is capable of being connected to the connecting seat of the external lamp bulb for mating use.

Figure 6:
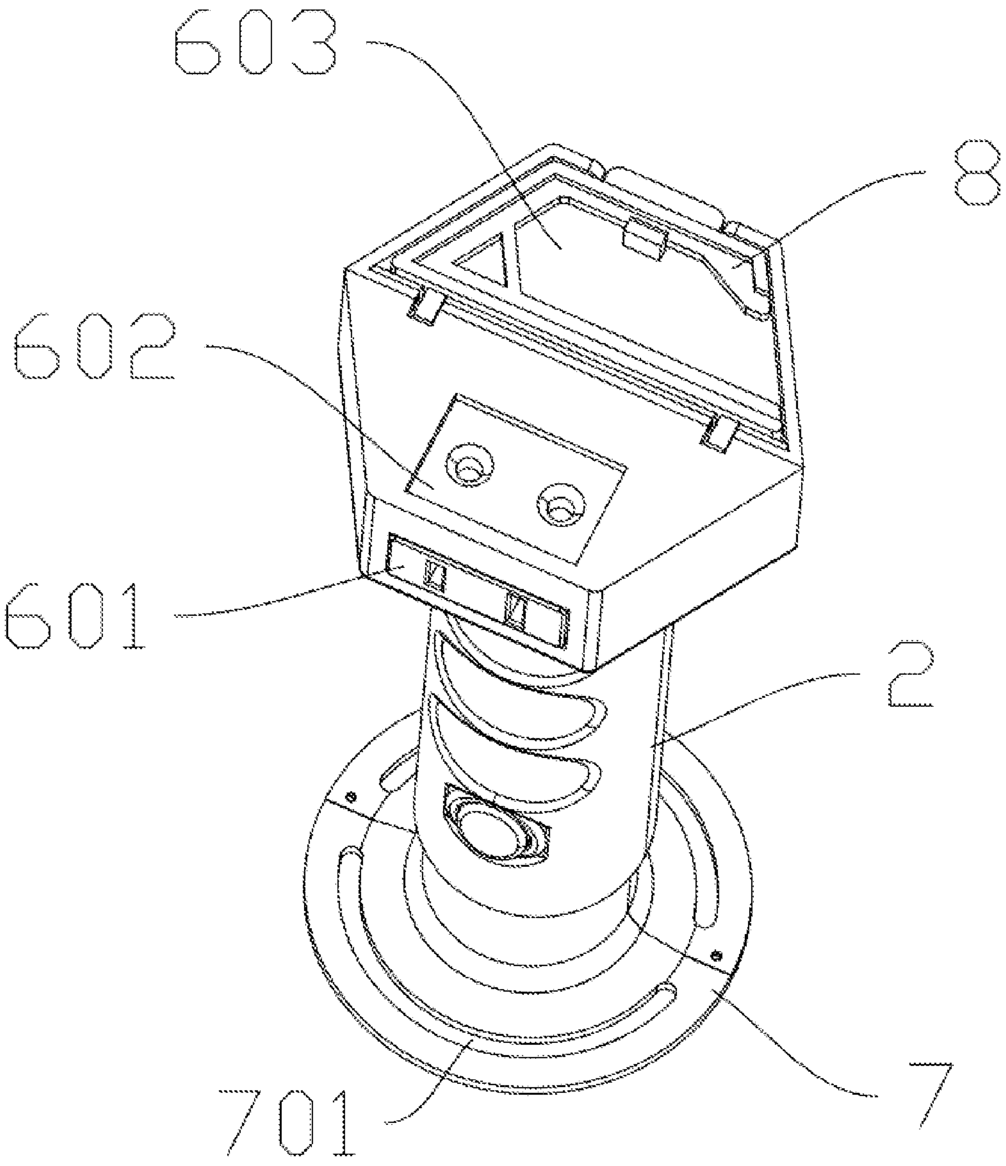
FIG. 6 is a schematic view from another viewing angle of the structure of a lamp pole of a hand-held working lamp of the present disclosure.
Figure 7:
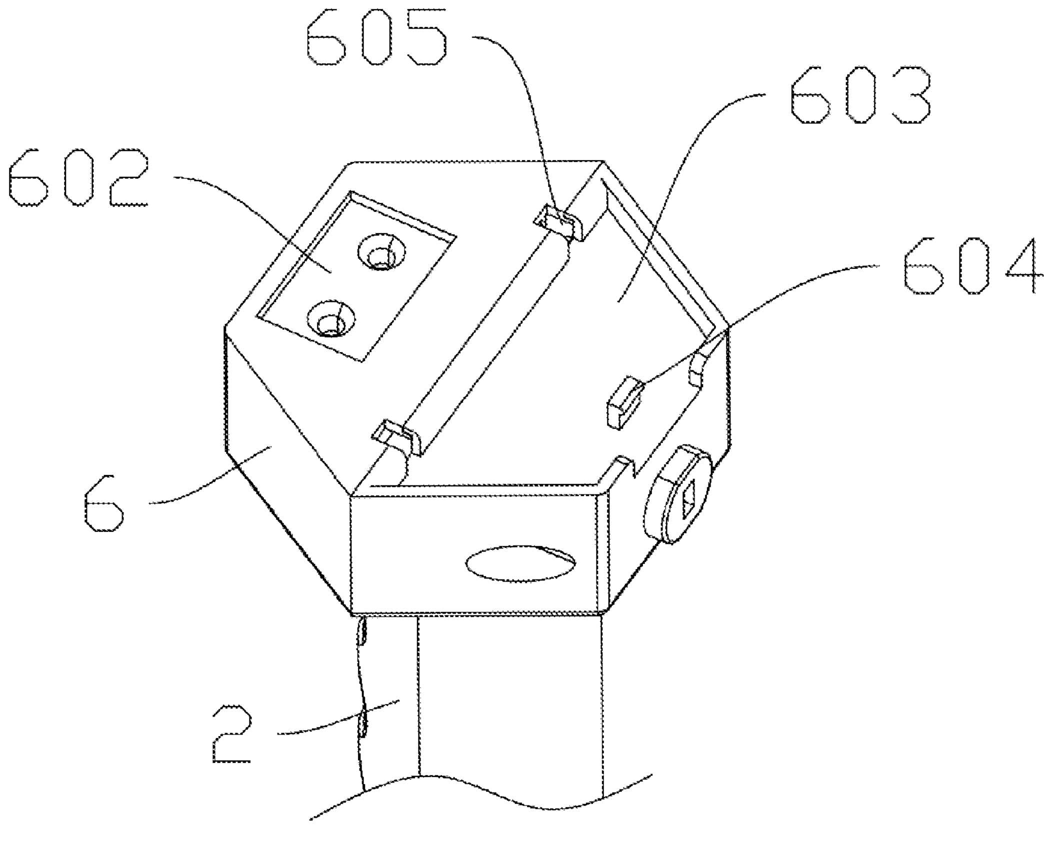
FIG. 7 is a schematic view of a local structure of a lamp pole of a hand-held working lamp of the present disclosure.
Figure 8:
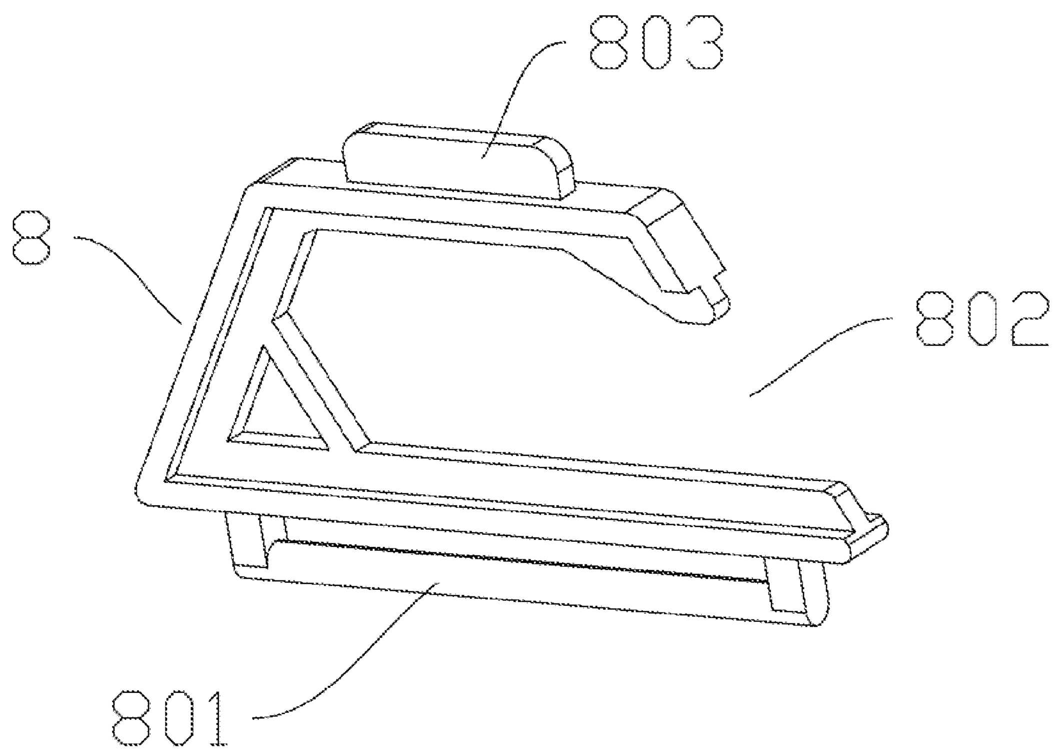
FIG. 8 is a schematic view of the structure of a hook of a hand-held working lamp of the present disclosure.
Figure 9:
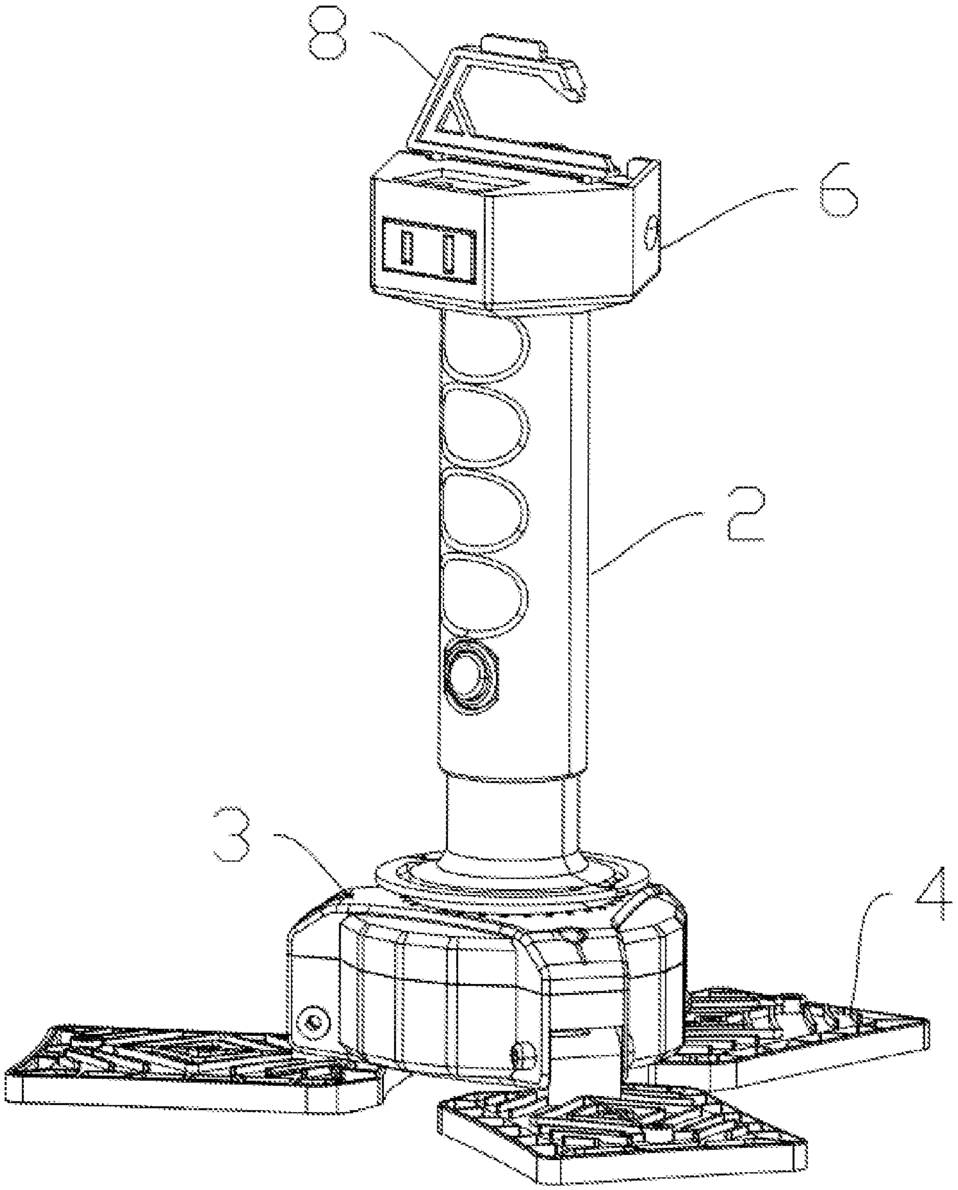
FIG. 9 is a schematic view of a use state in which a hand-held working lamp is matched with a hook of the present disclosure.
Figure 10:
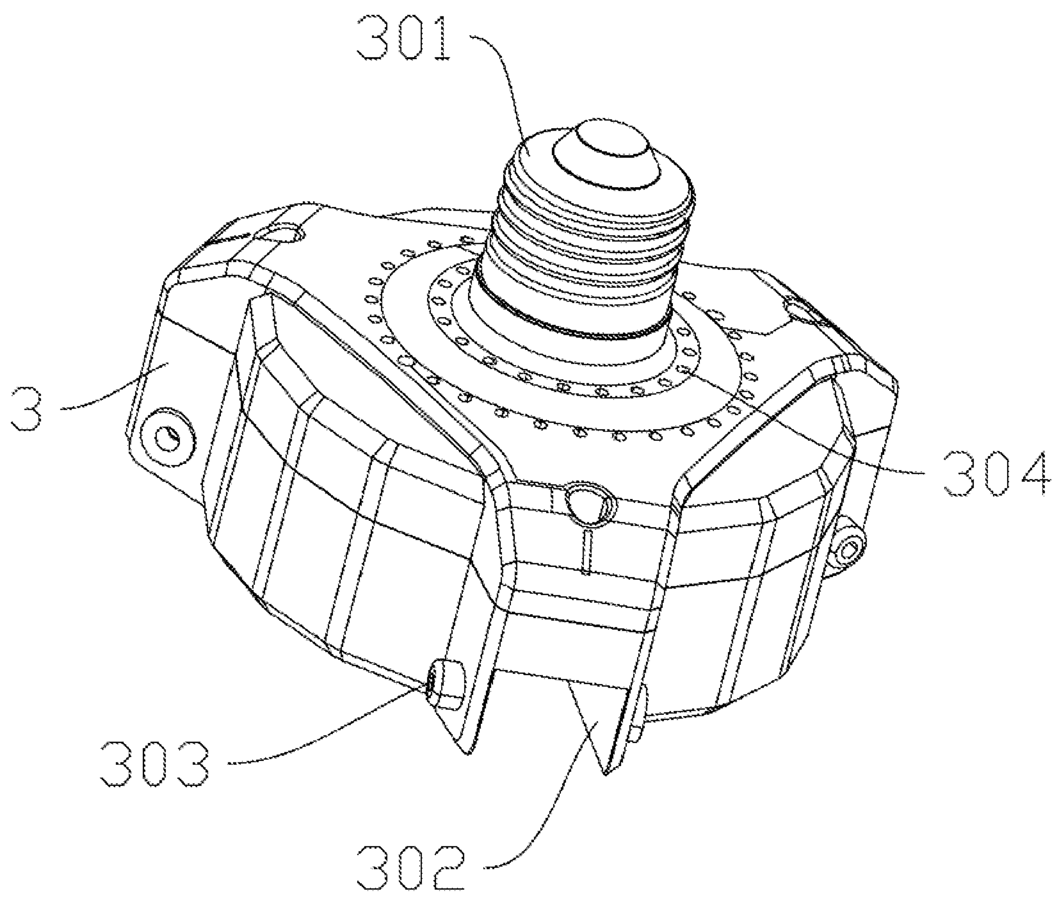
FIG. 10 is a schematic view of the structure of a lamp holder of a hand-held working lamp of the present disclosure.
Figure 11:
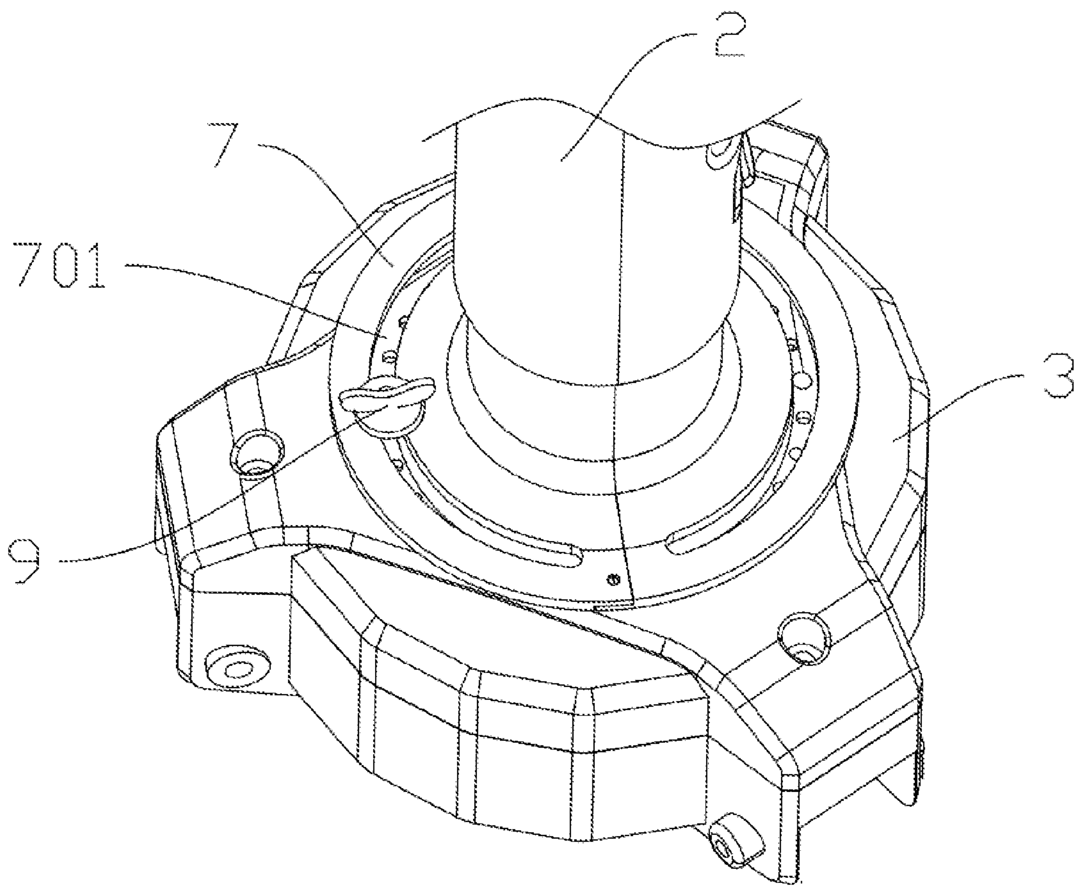
FIG. 11 is a schematic view of connection of a lamp pole and a lamp holder of a hand-held working lamp of the present disclosure.
Figure 12:
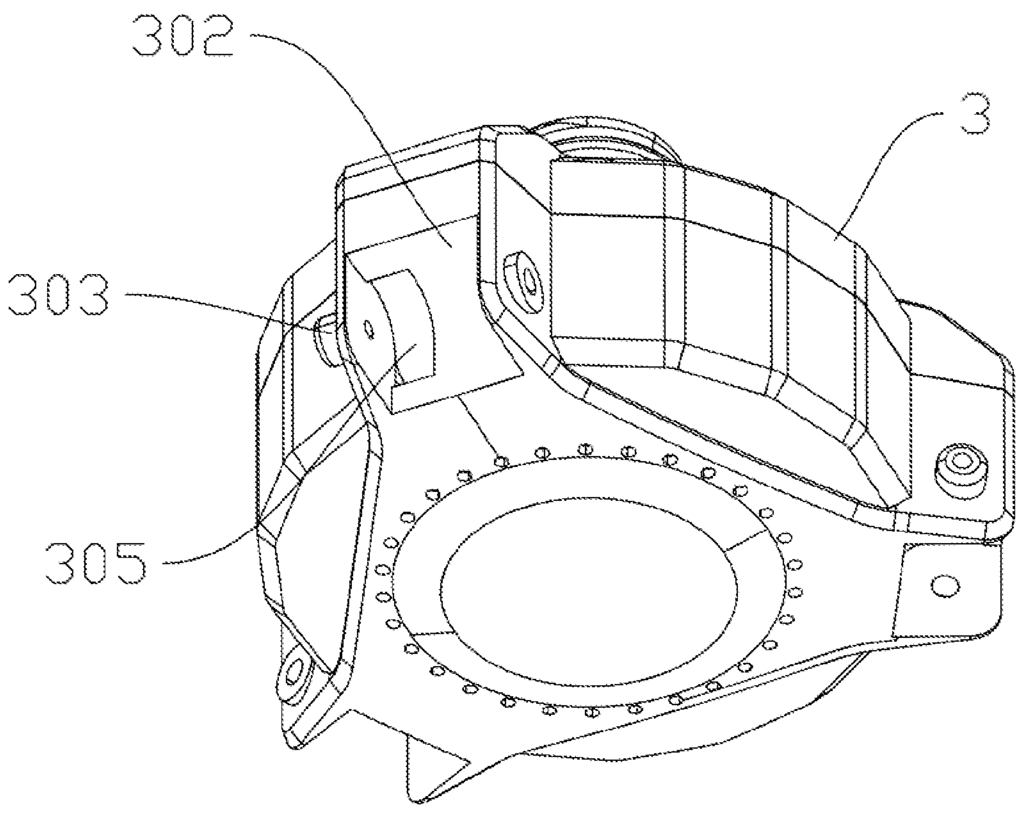
FIG. 12 is a schematic view from another viewing angle of the structure of a lamp holder of a hand-held working lamp of the present disclosure.
Figure 13:
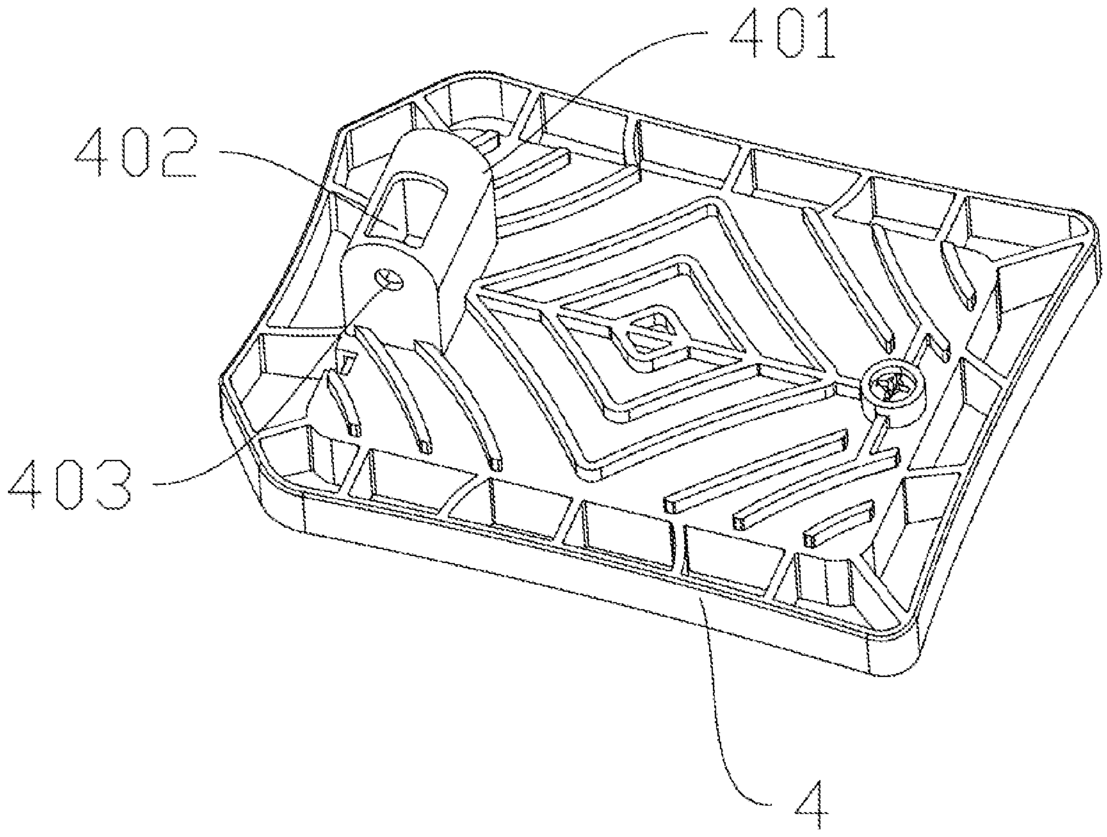
FIG. 13 is a schematic view of the structure of a lamp plate of a hand-held working lamp of the present disclosure.
Figure 14:
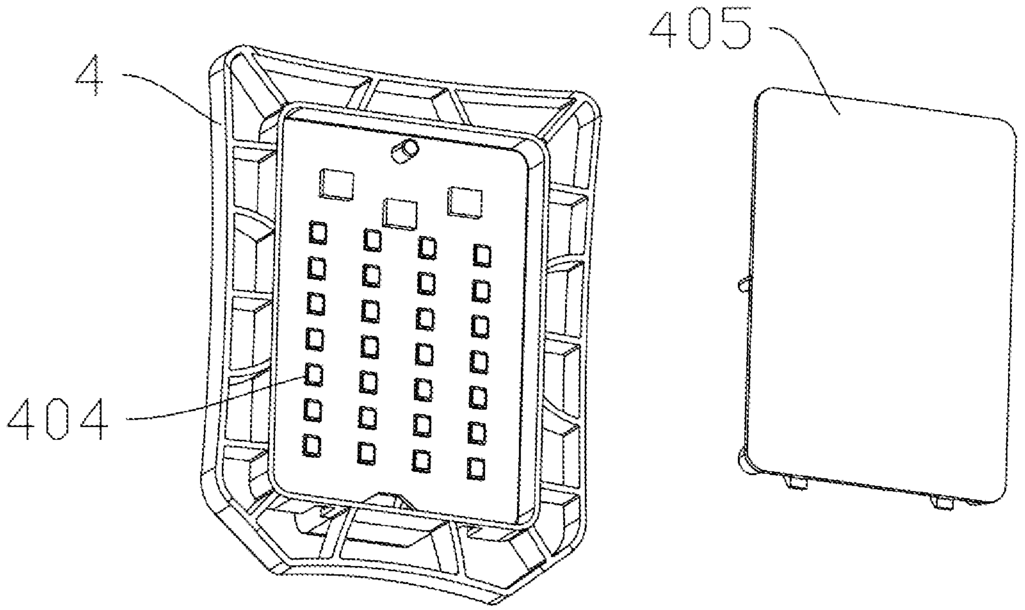
FIG. 14 is a schematic view of distribution of LED lamp sets of a hand-held working lamp of the present disclosure.
Figure 15:
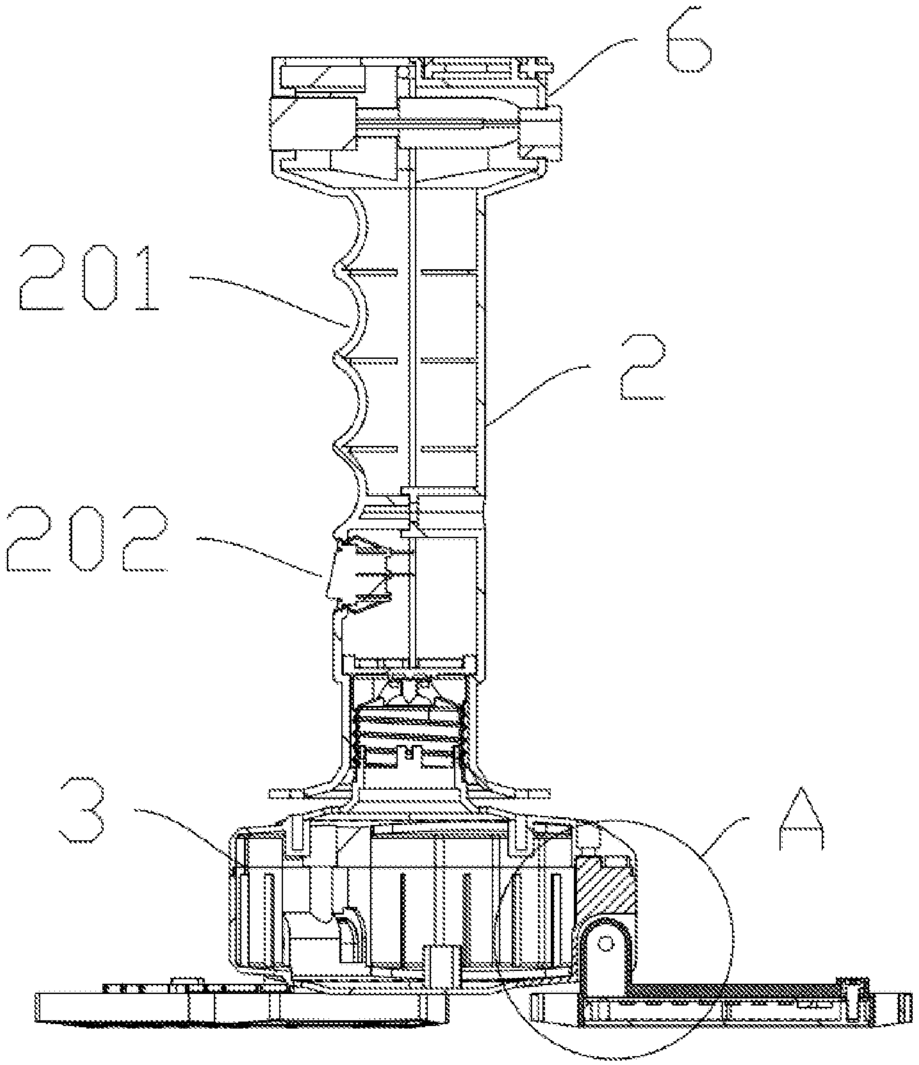
FIG. 15 is a sectional view of a hand-held working lamp of the present disclosure.
Figure 16:
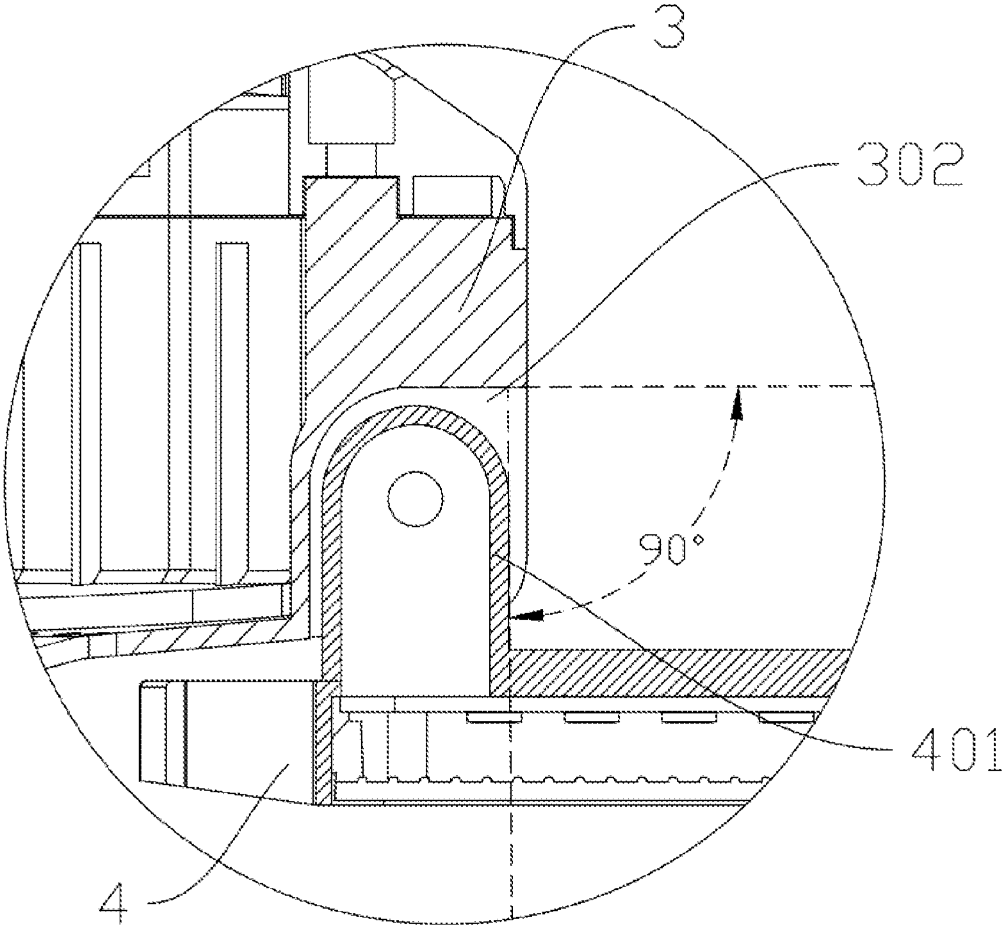
FIG. 16 is an enlarged view of position A in FIG. 15 of a hand-held working lamp of the present disclosure.
Figure 17:
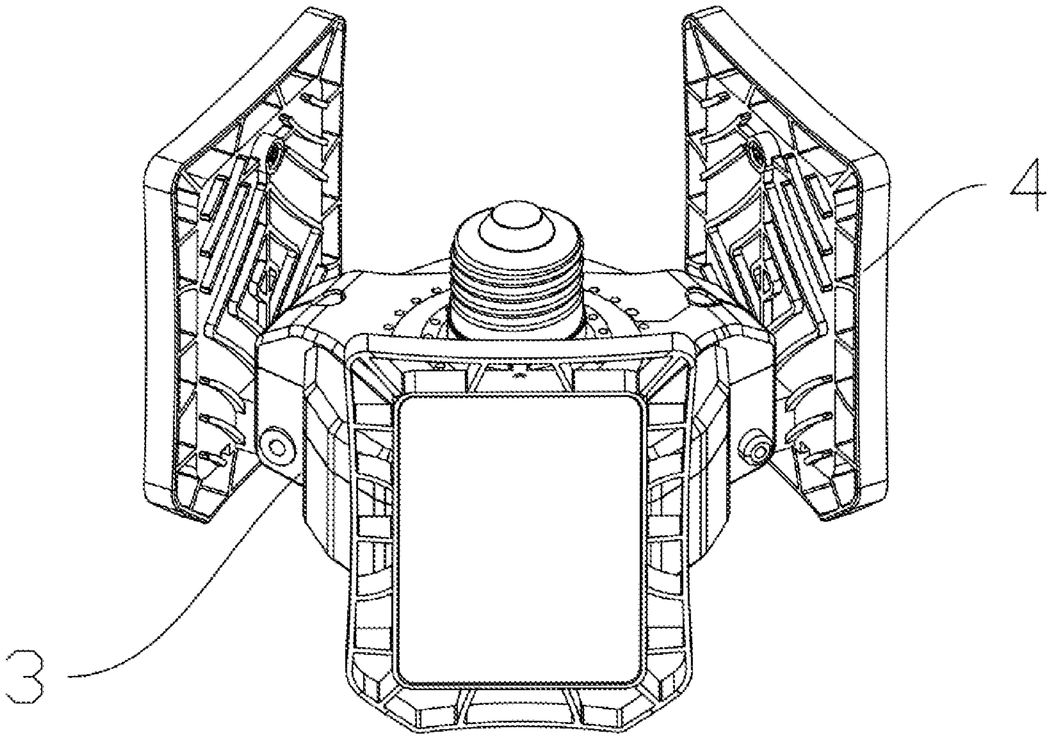
FIG. 17 is a schematic view of a state where an included angle between a lamp plate and a lamp holder of a hand-held working lamp of the present disclosure is an approximate right angle.
Figure 18:
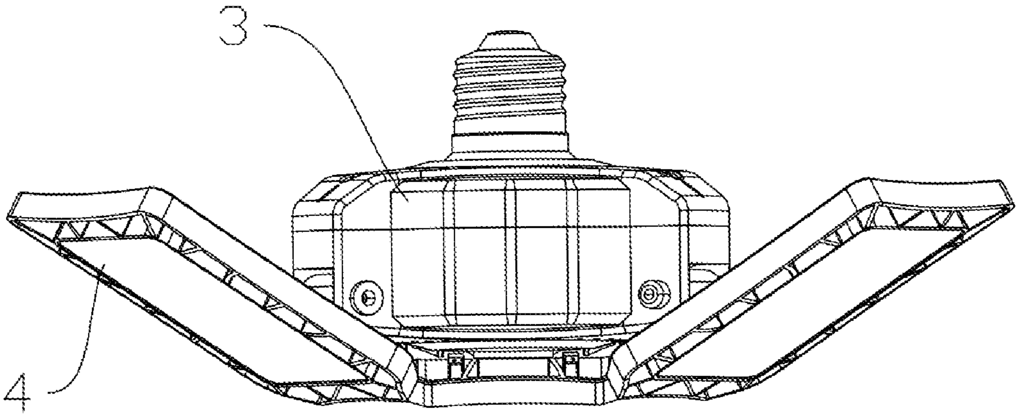
FIG. 18 is a schematic view of a state where an included angle between a lamp plate and a lamp holder of a hand-held working lamp of the present disclosure is an acute angle.
Figure 19:
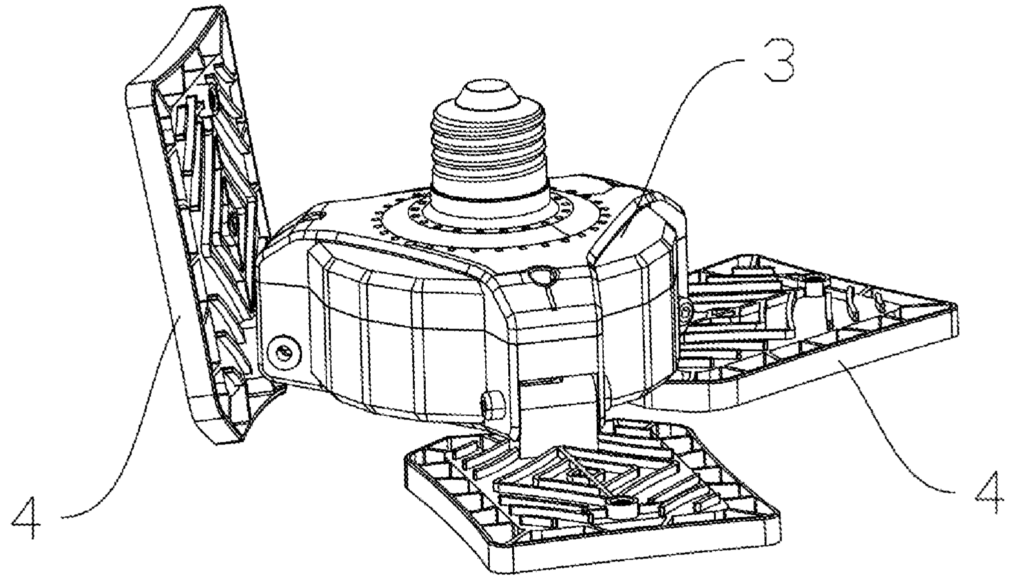
FIG. 19 is a schematic view of a state where included angles between a plurality of lamp plates and a lamp holder of a hand-held working lamp of the present disclosure are different.

With reference to FIG. 6 to FIG. 8, the functional seat 6 is provided with an accommodating groove 603 capable of accommodating the hook 8, the accommodating groove 603 is provided with hinged grooves 605, and the hook 8 is provided with hinged posts 801 rotationally connected to the hinged grooves 605. The hook 8 is in the shape of a trapezoid, one end of the hook 8 is provided with an opening 802, the hook 8 is provided with a clamping block 803, a limiting frame 604 matched with the clamping block 803 is mounted on the accommodating groove 603 and the limiting frame 604 is used for limiting the hook 8.

With reference to FIG. 9 to FIG. 19, the lamp plates 4 are distributed in a circular array on the lamp holder 3, the lamp holder 3 is provided with mounting cavities 302, the lamp plate 4 is provided with a bracket 401 located in the mounting cavity 302, the mounting cavity 302 is provided with a hinged block 303, and the bracket 401 is provided with a hinged hole 403 rotationally connected to the hinged block 303. The mounting cavity 302 is communicated with a first wire hole 305. The bracket 401 is provided with a second wire hole 402 communicated with the first wire hole 305. Primitive wires of a circuit in the lamp holder 3 and LED lamp sets 404 in the lamp plate 4 are connected conveniently due to the arrangement of the first wire hole 305 and the second wire hole 402. The LED lamp sets 404 are arranged in the lamp plate 4. The lamp plate 4 is provided with a transparent lampshade 405. The overturning angle of the lamp plate 4 on the lam holder 3 is able to be an acute angle by way of the bracket 401.

With reference to FIG. 3 to FIG. 6, the connector 301 and the connecting seat 5 are both in the shape of a spiral, and a magnetic member is used as the adsorption member 602, thereby facilitating adsorption and use of the lamp body 1 and an external magnetic attraction material. The lamp pole 2 is provided with a holding part 201 and a control switch 202, and the control switch 202 controls a work state of the LED lamp set 404. The adsorption member 602 is located on one side of the hook 8. The socket 601 is located on one side of the adsorption member 602. The socket 601 is capable of being externally connected to a plug wire of a neighboring lamp body 1. In the present embodiment, the effect of simultaneous illumination of a plurality of lamp bodies 1 can be achieved by connecting the plurality of lamp bodies 1 in series in the manner that the plug wires thereof are plugged into the socket 601.

With reference to FIG. 6 to FIG. 11, a support 7 is arranged at one end of the lamp pole 2, the support 7 is in the shape of a ring, and the support 7 is provided with lock grooves 701. The lamp holder 3 is provided with lock holes 304, and locking members 9 matched with the lock holes 304 are connected to the lock groove 701. By way of the arrangement, the lamp pole 2 and the lamp holder 3 can be further fixed easily, which prevents the lamp pole and the lamp holder from becoming loose and disengaging from each other during use of the lamp body 1.

The lamp body 1 of the hand-held working lamp provided by the present embodiment can be matched with the external pendant by way of the hook 8 to be suspended and used as t ceiling lamp. The lamp body 1 can also be fixed to the surface of an object for use by way of the adsorption member 602. The overturning angle of the lamp plate 4 on the lamp holder 3 can be freely selected between 0 and 90 degrees so as to achieve the effect of different lighting ranges of the lamp body 1. After the lamp holder 3 is separated from the lamp pole 2, the lamp holder 3 can be connected to the connecting seat of the external lamp bulb for mating use. The lamp pole 2 can also be connected to the external lamp bulb for use. The functions of the hand-held working lamp are diverse, thereby bringing convenience to a user.

The above is only preferred implementations of the present disclosure, it should be noted that, a person of ordinary skill in the art can further make several improvements and refinements without departing from the technical principle of the present disclosure, and the improvements and refinements shall fall within the protection scope of the present disclosure.

What is claimed is:

1. A hand-held working lamp, comprising a lamp body (1), wherein the lamp body (1) comprises a lamp holder (3) and a lamp pole (2) which are detachably connected, lamp plates (4) are hinged to the lamp holder (3), and an overturning angle of the lamp plate (4) on the lamp holder (3) approximates to a right angle/flat angle; the lamp pole (2) is provided with a connecting seat (5) capable of being connected to an external lamp bulb, and the lamp holder (3) is provided with a connector (301) capable of being connected to the connecting seat (5); the lamp pole (2) is provided with a functional seat (6), and the functional seat (6) is provided with a hook (8), an adsorption member (602) and a socket (601); when in use, the lamp body (1) is capable of being matched with an external pendant by way of the hook (8) to be suspended for use; the lamp body (1) is capable of being fixed to a surface of an object for use by way of the adsorption member (602); an effect of various lighting ranges is achieved by overturning the lamp plate (4) on the lamp holder (3); and the lamp holder (3) is capable of being connected to the connecting seat of the external lamp bulb for mating use.

2. The hand-held working lamp according to claim 1, wherein the lamp plates (4) are distributed in a circular array on the lamp holder (3), the lamp holder (3) is provided with mounting cavities (302), the lamp plate (4) is provided with a bracket (401) located in the mounting cavity (302), the mounting cavity (302) is provided with a hinged block (303), and the bracket (401) is provided with a hinged hole (403) rotationally connected to the hinged block (303).

3. The hand-held working lamp according to claim 1, wherein the functional seat (6) is provided with an accommodating groove (603) capable of accommodating the hook (8), the accommodating groove (603) is provided with hinged grooves (605), and the hook (8) is provided with hinged posts (801) rotationally connected to the hinged grooves (605).

4. The hand-held working lamp according to claim 1, wherein the adsorption member (602) is located on one side of the hook (8), the socket (601) is located on one side of the adsorption member (602), and the socket (601) is capable of being externally connected to a plug wire of a neighboring lamp body (1).

5. The hand-held working lamp according to claim 1, wherein a support (7) is arranged at one end of the lamp pole (2), the support (7) is in the shape of a ring, and the support (7) is provided with lock grooves (701).

6. The hand-held working lamp according to claim 5, wherein the lamp holder (3) is provided with lock holes (304), and locking members (9) matched with the lock holes (304) are connected to the lock groove (701).

7. The hand-held working lamp according to claim 2, wherein the mounting cavity (302) is communicated with a first wire hole (305), the bracket (401) is provided with a second wire hole (402) communicated with the first wire hole (305), LED lamp sets (404) are arranged in the lamp plate (4), and the lamp plate (4) is provided with a transparent lampshade (405).

8. The hand-held working lamp according to claim 2, wherein the overturning angle of the lamp plate (4) on the lam holder (3) is able to be an acute angle by way of the bracket (401).

9. The hand-held working lamp according to claim 3, wherein the hook (8) is in the shape of a trapezoid, one end of the hook (8) is provided with an opening (802), the hook (8) is provided with a clamping block (803), and a limiting frame (604) matched with the clamping block (803) is mounted on the accommodating groove (603).

10. The hand-held working lamp according to claim 1, wherein the connector (301) and the connecting seat (5) are both in the shape of a spiral, a magnetic member is used as the adsorption member (602), and the lamp pole (2) is provided with a holding part (201) and a control switch (202).

* * * * *